United States Patent
Chen et al.

(10) Patent No.: US 10,156,701 B2
(45) Date of Patent: Dec. 18, 2018

(54) OPTICAL LENS

(71) Applicant: ABILITY ENTERPRISE CO., LTD., New Taipei (TW)

(72) Inventors: Jung-Yao Chen, New Taipei (TW); Yu-Min Chang, New Taipei (TW); Yen-Chen Chiang, New Taipei (TW)

(73) Assignee: ABILITY ENTERPRISE CO., LTD., New Taipei (TW)

( * ) Notice: Subject to any disclaimer, the term of this patent is extended or adjusted under 35 U.S.C. 154(b) by 0 days.

(21) Appl. No.: 15/095,867

(22) Filed: Apr. 11, 2016

(65) Prior Publication Data
US 2016/0306141 A1  Oct. 20, 2016

(30) Foreign Application Priority Data
Apr. 14, 2015  (TW) .............................. 104111911 A

(51) Int. Cl.
G02B 9/62  (2006.01)
G02B 13/00  (2006.01)
G02B 1/04  (2006.01)

(52) U.S. Cl.
CPC .......... G02B 13/0045 (2013.01); G02B 9/62 (2013.01); G02B 1/04 (2013.01)

(58) Field of Classification Search
CPC ......... G02B 9/62; G02B 9/64; G02B 13/0045
USPC ........................................ 359/713, 754–759
See application file for complete search history.

(56) References Cited

U.S. PATENT DOCUMENTS

| 8,643,957 B2 * | 2/2014 | Chen ................. G02B 13/0045 359/713 |
| 8,786,961 B2 | 7/2014 | Sano |
| 9,366,841 B2 | 6/2016 | Kubota et al. |
| 2013/0235493 A1 | 9/2013 | Meng |
| 2014/0153117 A1 * | 6/2014 | Hagiwara .......... G02B 13/0045 359/757 |
| 2014/0185141 A1 * | 7/2014 | Lee ........................ G02B 9/62 359/557 |
| 2014/0355134 A1 * | 12/2014 | Sekine ............... G02B 13/0045 359/713 |
| 2015/0362701 A1 * | 12/2015 | Hsu ....................... G02B 13/00 359/757 |

FOREIGN PATENT DOCUMENTS

| CN | 102621667 A | 8/2012 |
| CN | 102985865 A | 3/2013 |
| CN | 202975455 U | 6/2013 |
| CN | 103869452 A | 6/2014 |
| JP | H10221597 A | 8/1998 |

OTHER PUBLICATIONS

Chinese Office Action dated Feb. 9, 2018.
Chinese Office Action dated Jul. 16, 2018.
Taiwanese Office Action dated Sep. 11, 2018.

* cited by examiner

Primary Examiner — Darryl J Collins
(74) Attorney, Agent, or Firm — Rabin & Berdo, P.C.

(57) ABSTRACT

This present invention provides an optical lens, which includes, in order from an object side to an image-forming side, a first lens group having positive refraction power and a second lens group having negative refraction power. The first lens group comprises a first lens, a second lens, and a third lens. The second lens group comprises a fourth lens, a fifth lens, and a sixth lens. The first lens is a plastic lens, the fourth lens is a convex-concave lens, and the sixth lens is an aspheric lens.

19 Claims, 2 Drawing Sheets

OPTICAL LENS

This application claims the benefit of Taiwan application Serial No. 104111911, filed Apr. 14, 2015, and the subject matter of which is incorporated herein by reference.

BACKGROUND

Technical Field

The present invention relates to an optical lens, especially to an optical lens with smaller volume and better image quality.

Description of the Related Art

In recent years, along with the advance of portable electronic products having image-capturing functions, people's needs for optical systems continuously increase. With the pursuit of miniaturization, the requirements for image qualities have gradually increased as well.

A conventional optical image-capturing system installed in portable electronic products is usually formed of several lenses. However, due to the popularity of high level mobile devise, such as smart phones, users have quickly upgraded their requirements for the pixels and imaging qualities of optical image-capturing systems. In addition, sizes of photosensitive components have increased as well; accordingly, conventional optical systems have failed to satisfy the current trends.

Therefore, it is in need to provide novel optical lenses having reduced sizes and improved image qualities with reduced costs.

SUMMARY OF THE INVENTION

The present invention is related to an optical lens having a reduced size and a good image quality.

The present invention provides an optical lens. The optical lens includes, in order from an object side to an image-forming side: a first lens having positive refractive power, a second lens having refractive power, a third lens having positive refractive power, a fourth lens having refractive power, a fifth lens having refractive power, and a sixth lens having refractive power, wherein the fourth lens is a convex-concave lens.

The present invention further provides an optical lens. The optical lens includes, in order from an object side to an image-forming side: a first lens having positive refractive power, a second lens having refractive power, a third lens having positive refractive power, a fourth lens having refractive power, a fifth lens having refractive power, and a sixth lens having refractive power, wherein the first lens is a plastic lens.

The present invention still further provides an optical lens. The optical lens has an optical axis. The optical lens includes, in order from an object side to an image-forming side: a first lens having positive refractive power, a second lens having refractive power, a third lens having positive refractive power, a fourth lens having refractive power, a fifth lens having refractive power, and a sixth lens having refractive power, wherein an image-side surface of the sixth lens has an infection point, a distance between the infection point of the sixth lens and the optical axis is h6, a radius of the sixth lens is H6, and h6/H6<0.9.

The above and other aspects of the invention will become better understood with regard to the following detailed description of the preferred but non-limiting embodiment(s). The following description is made with reference to the accompanying drawings.

DETAILED DESCRIPTION OF THE INVENTION

Figure 1:
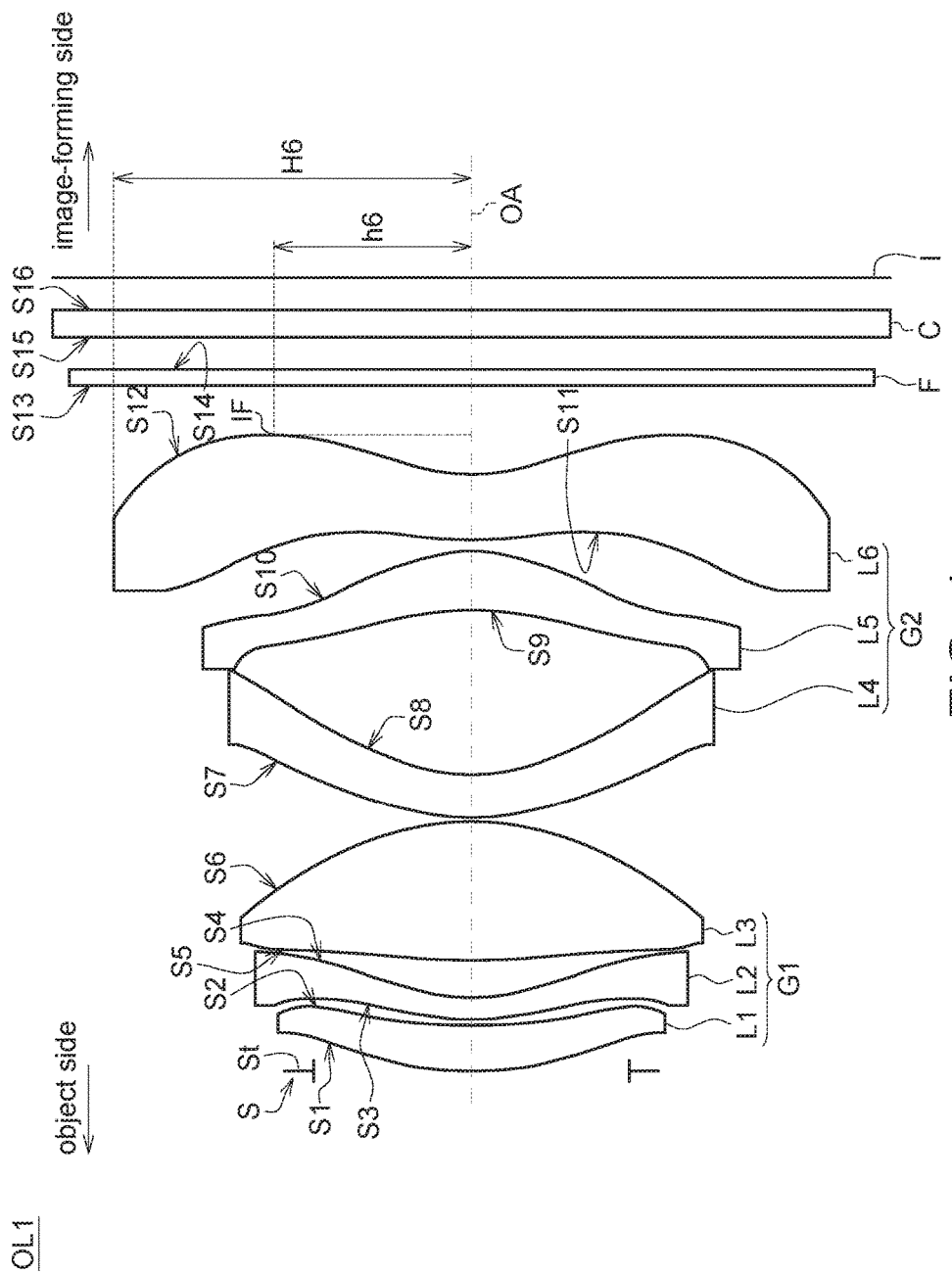
FIG. 1 shows an optical lens according an embodiment of the present invention.

The embodiments of the present invention are described in details with reference to the accompanying drawings. While the invention will be described in conjunction with these specific embodiments, it will be understood that it is not intended to limit the invention to these embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well-known components and process operations are not described in detail in order not to unnecessarily obscure the present invention. Identical or similar elements of the embodiments are designated with the same or similar reference numerals. While drawings are illustrated in details, it is appreciated that the quantity or sizes of the disclosed components may be greater or less than that disclosed, except expressly restricting the amount or the sizes of the components.

FIG. 1 shows an optical lens OL1 according an embodiment of the present invention. To highlight the features of the present embodiment, the drawings merely show components related to the present embodiment, and the irrelevant or minor components are omitted. The optical lens OL1 of the present embodiment may be a fixed-focus lens and may be employed in a device capable of projecting or capturing images. For example, the device may be but not limited to a hand-held communication system, a car imaging lens, a monitoring system, a digital camera, a digital camcorder or a projector.

As shown in FIG. 1, in the present embodiment, the optical lens OL1 includes, in order from an object side to an image-forming side, a first lens group G1 and a second lens group G2. The first lens group G1 includes, in order from the object side to the image-forming side, a first lens L1, a second lens L2, and a third lens L3. The second lens group G2 includes, in order from the object side to the image-forming side, a fourth lens L4, a fifth lens L5, and a sixth lens L6.

In the embodiment, the first lens group G1 has positive refractive power, and the second lens group G2 has negative refractive power.

In the embodiment, the optical lens OL1 may satisfy the conditions: $0.65 \leq F123/EFL$ and/or $F123/EFL \leq 0.90$. F123 is an effective focal length of the first lens L1, the second lens L3, and the third lens L3, or the focal length of the first lens group G1. EFL is an effective focal length of the optical lens OL1. Furthermore, the optical lens OL1 may satisfy the conditions: $0.70 \leq F123/EFL$ and/or $F123/EFL \leq 0.85$.

In an embodiment, the optical lens OL1 may also satisfy the condition: $TTL \leq 20$ millimeter (mm). TTL is a distance between an object-side surface S1 of the first lens L1 and an imaging plane I. Specifically speaking, TTL is a distance from a cross point of the object-side surface S1 of the first lens L1 and an optical axis OA of the optical lens OL1 to the imaging plane I. Furthermore, the optical lens OL1 may satisfy the conditions: 10 mm≤TTL, 10 mm≤TTL≤20 mm, or TTL≤18 mm.

In the embodiment, the optical lens OL1 may satisfy the condition: 0.65≤EFL/TTL and/or EFL/TTL≤0.80.

In an embodiment, the optical lens OL1 may also satisfy the conditions: 1≤Fno and/or Fno≤2.5. Fno is a F-number of the optical lens OL1. Furthermore, the optical lens OL1 may satisfy the conditions: 1.35≤Fno, 1.5≤Fno, Fno≤2, and/or Fno≤2.3.

In the embodiment, the optical lens OL1 may satisfy the condition: nd1≤1.65, wherein nd1 is the refractive index of the first lens L1. Furthermore, the optical lens OL1 may satisfy the conditions: 1.40≤nd1 or 1.40≤nd1≤1.65.

In the embodiment, the optical lens OL1 may also satisfy the condition: 35≤vd1, wherein vd1 is an Abbe number of the first lens L1. Furthermore, the optical lens OL1 may satisfy the conditions: 45≤vd1, vd1≤70, 35≤vd1≤70, or 45≤vd1≤70.

In the embodiment, the optical lens OL1 may also satisfy the condition: V4≤30, wherein V4 is an Abbe number of the fourth lens L4.

In the embodiment, the optical lens OL1 may also satisfy the condition: |V5−V6|≤10, wherein V5 is an Abbe number of the fifth lens L5, and V6 is an Abbe number of the sixth lens L6. Furthermore, the optical lens OL1 may satisfy the conditions: |V5−V6|≤8.5, |V5−V6|≤7.5, |V5−V6|≤5 or |V5−V6|≤3.

In the embodiment, the signs of refractive powers of the first lens L1, the second lens L2, the third lens L3, the fourth lens L4, the fifth lens L5, and the sixth lens L6 may be in staggered arrangement.

For example, the first lens L1 may have positive refractive power, the second lens L2 may have negative refractive power, the third lens L3 may have positive refractive power, the fourth lens L4 may have negative refractive power, the fifth lens L5 may have positive refractive power, and the sixth lens L6 may have negative refractive power; but the invention is not limited thereto.

In an embodiment, at least one of the first lens L1, the second lens L2, the third lens L3, the fourth lens L4, the fifth lens L5, and the sixth lens L6 may be a free-form lens or an aspheric lens.

Specifically speaking, each of the free-form lenses has at least one free-form surface; that is, the object-side surface and/or the image-side surface of a free-form lens is a free-form surface. Each of the aspheric lenses has at least one aspheric surface; that is, the object-side surface and/or the image-side surface of an aspheric lens is an aspheric surface. Each of the aspheric surfaces may satisfy the following equation:

$$Z = \left[\frac{(C*Y^2)}{1+\sqrt{1-(K+1)C^2Y^2}}\right] + \sum (A_i * Y^i)$$

where Z is the coordinate in the optical axis OA direction, and the direction of the light propagation is designated as positive; A4, A6, A8, A10, A12, A14, and A16 are aspheric coefficients; K is coefficient of quadratic surface; C is reciprocal of R (C=1/R); R is the radius of curvature; Y is the coordinate in a direction perpendicular to the optical axis OA, in which the upward direction away from the optical axis OA is designated as positive. In addition, each of the parameters or the coefficients of the equation of each of the aspheric lenses may be designated respectively to determine the focal length of each of the aspheric lenses.

Besides, in the embodiment, the first lens L1, at least one of the second lens L2, the third lens L3, the fourth lens L4, the fifth lens L5, and the sixth lens L6 may be a plastic lens formed of a plastic material. In an alternative embodiment, the first lens L1 may be a plastic lens, and any one of the second lens L2, the third lens L3, the fourth lens L4, the fifth lens L5, and the sixth lens L6 may be a plastic lens or a glass lens formed of a glass material. The material of the plastic lenses may include, but not limited to, polycarbonate, cyclic olefin copolymer (e.g. APEL), polyester resins (e.g. OKP4 or OKP4HT), or a mixture material including at least one of the above-mentioned three materials.

In the embodiment, the object-side surface S1 and/or the image-side surface S2 of the first lens L1 may be aspheric surface(s), and the first lens L1 may be a plastic lens. As shown in FIG. 1, the object-side surface S1 of the first lens L1 may be a convex surface toward the object side, the image-side surface S2 may be a concave surface concave toward the object side, both of the object-side surface S1 and the image-side surface S2 have positive refractive powers, and the first lens L1 has positive refractive power. Furthermore, the first lens L1 may be a lens having positive refractive power, a concave-convex lens, an aspheric lens, and/or a plastic lens.

In the embodiment, the object-side surface S3 and/or the image-side surface S4 of the second lens L2 may be aspheric surface(s), and the second lens L2 may be a plastic lens or a glass lens. As shown in FIG. 1, the object-side surface S3 of the second lens L2 may be a convex surface toward the object side, the image-side surface S4 may be a concave surface concave toward the object side, both of the object-side surface S3 and the image-side surface S4 have positive refractive powers, and the second lens L2 has negative refractive power. Furthermore, the second lens L2 may be a lens having negative refractive power, a concave-convex lens, and/or an aspheric lens, and the second lens L2 may be a plastic lens or a glass lens.

In the embodiment, the object-side surface S5 and/or the image-side surface S6 of the third lens L3 may be aspheric surface(s), and the third lens L3 may be a plastic lens or a glass lens. As shown in FIG. 1, the object-side surface S5 of the third lens L3 may be a convex surface toward the object side, the image-side surface S6 may be a convex surface toward the image-forming side, the object-side surface S5 has positive refractive power, the image-side surface S6 has negative refractive power, and the third lens L3 has positive refractive power. Furthermore, the third lens L3 may be a lens having positive refractive power, a double convex lens, and/or an aspheric lens, and the third lens L3 may be a plastic lens or a glass lens.

In the embodiment, the object-side surface S7 and/or the image-side surface S8 of the fourth lens L4 may be aspheric surface(s), and the fourth lens L4 may be a plastic lens or a glass lens. As shown in FIG. 1, the object-side surface S7 of the fourth lens L4 may be a convex surface toward the object side, the image-side surface S8 may be a concave surface concave toward the object side, both of the object-side surface S7 and the image-side surface S8 have positive refractive powers, and the fourth lens L4 has negative refractive power. Furthermore, the fourth lens L4 may be a lens having negative refractive power, a convex-concave lens, and/or an aspheric lens, and the fourth lens L4 may be a plastic lens or a glass lens.

In the embodiment, the object-side surface S9 and/or the image-side surface S10 of the fifth lens L5 may be aspheric surface(s), and the fifth lens L5 may be a plastic lens or a glass lens. As shown in FIG. 1, the object-side surface S9 of the fifth lens L5 may be a concave surface concave toward the object side, the image-side surface S10 may be a convex surface toward the image-forming side, both of the object-side surface S9 and the image-side surface S10 have negative refractive powers, and the fifth lens L5 has positive refractive power. Furthermore, the fifth lens L5 may be a lens having positive refractive power, a concave-convex lens, and/or an aspheric lens, and the fifth lens L5 may be a plastic lens or a glass lens.

Referring to FIG. 1, the object-side surface S9 of the fifth lens L5 has at least an inflection point IF9, and the image-side surface S10 of the fifth lens L5 has at least an inflection point IF10.

In the embodiment, the object-side surface S11 and/or the image-side surface S12 of the sixth lens L6 may be aspheric surface(s), and the sixth lens L6 may be a plastic lens or a glass lens. As shown in FIG. 1, the object-side surface S11 of the sixth lens L6 forms a substantially concave surface concave toward the image-forming side, the image-side surface S12 of the sixth lens L6 forms a substantially convex surface protruded toward the object side and forms a concave surface concave toward the object side at a location close to the central region of the image-side surface S12. Both of the object-side surface S11 and the image-side surface S12 have negative refractive powers at the optical axis OA, and the sixth lens L6 has negative refractive power. Furthermore, the sixth lens L6 may be a lens having negative refractive power and/or an aspheric lens, and the sixth lens L6 may be a plastic lens or a glass lens.

As shown in FIG. 6, the image-side surface S12 of the sixth lens L6 has an infection point IF12, a distance between the infection point IF12 of the sixth lens L6 and the optical axis OA is h6, and a radius of the sixth lens is H6. The optical lens L1 may also satisfy the conditions: h6/H6<1 or h6/H6≤0.9. Furthermore, the optical lens L1 may satisfy the conditions: h6/H6≤0.85 or h6/H6≤0.70.

In another embodiment, h6 may be a minimum distance between the infection point IF12 of the sixth lens L6 and the optical axis OA, and H6 may be a minimum distance between an outer edge of the sixth lens L6 and the optical axis OA.

In another embodiment, the first distance h6 may be defined as the location on the image-side surface S12 of the sixth lens L6 which is closest to the imaging plane I. In a further embodiment, the second distance H6 may be defined as the effective aperture of the sixth lens L6, and the first distance h6 may be defined as the effective aperture of the sixth lens L6 with respect to the light beam.

Moreover, as shown in FIG. 1, the optical lens OL1 may further include a stop St and a filter F. The stop St may be arranged at the object side of the first lens L1, between any two of the lenses L1-L6 of the optical lens OL1, or between the sixth lens L6 and the imaging plane I. The filter F may be arranged between the sixth lens L6 and the imaging plane I. The filter F may be an infrared light filter. In addition, a photoelectric converting unit or an image capturing unit may be disposed on the imaging plane I for detecting light beams passing through the optical lens OL1. Moreover, the optical lens OL1 may further include a protection plate C disposed between the imaging plane I and the filter F. In another embodiment, the filter F may be provided with protection functions, and the protection plate C can be omitted. However, the optical lens OL1 is not limited to the above-mentioned.

Table 1 lists the detail information of the optical lens OL1 according to an embodiment of this invention. The detail information includes the curvature radius, the thickness, the radius, the refractive index, and the Abbe number of each of the lenses, but the invention is not limited thereto. The surface numbers of the lenses are sequentially ordered from the object side to the image-forming side. For example, "S" stands for the stop, "S1" stands for the object-side surface S1 of the first lens L1, "S2" stands for the image-side surface S2 of the first lens L1, "S13" and "S14" respectively stand for the object-side surface S13 and the image-side surface S14 of the filter F, and "S15" and "S16" respectively stand for the object-side surface S15 and the image-side surface S16 of the protection plate C. In addition, the "thickness" stands for the distance between an indicated surface and an adjacent surface close to the image-forming side. For example, the thickness of the surface S1 indicated in table 1 is the distance between the surface S1 and the surface S2.

TABLE 1

| Lens | Surface number | Curvature radius (mm) | Thickness (mm) | Radius (mm) | Refractive index | Abbe number |
|---|---|---|---|---|---|---|
| St | S | ∞ | 0.05 | 1.14 | | |
| L1 | S1 | 6.41 | 0.85 | 1.32 | 1.53 | 58.2 |
| | S2 | 19.97 | 0.10 | 1.43 | | |
| L2 | S3 | 5.08 | 0.38 | 1.51 | 1.64 | 24.1 |
| | S4 | 3.28 | 0.70 | 1.63 | | |
| L3 | S5 | 19.61 | 2.53 | 1.72 | 1.53 | 60 |
| | S6 | −4.81 | 0.08 | 1.76 | | |
| L4 | S7 | 4.51 | 0.78 | 2.11 | 1.64 | 24.6 |
| | S8 | 3.08 | 3.01 | 2.32 | | |
| L5 | S9 | −5.32 | 1.07 | 2.85 | 1.54 | 60 |
| | S10 | −3.01 | 0.22 | 3.15 | | |
| L6 | S11 | 6.97 | 1.19 | 3.18 | 1.54 | 59.5 |
| | S12 | 2.77 | 0.99 | 4.04 | | |
| F | S13 | ∞ | 0.30 | 6.21 | 1.52 | 64.2 |
| | S14 | ∞ | 0.40 | 6.32 | | |
| C | S15 | ∞ | 0.50 | | 1.52 | 64.2 |
| | S16 | ∞ | 1.20 | | | |
| | I | ∞ | 0.00 | | | |

Moreover, if any one of the object-side surfaces S1, S3, S5, S7, S9, and S11 and image-side surfaces S2, S4, S6, S8, S10, and S12 is aspheric, and the aspheric coefficients of the above-mentioned surfaces may be listed as indicated in table 2; the invention is not limited thereto.

TABLE 2

| | S1 | S2 | S3 | S4 | S5 | S6 |
|---|---|---|---|---|---|---|
| K | −7.07 | −49.57 | 0.85 | −3.00 | −50.00 | −1.45 |
| A4 | 3.384E−03 | 9.134E−03 | −8.192E−03 | −5.923E−03 | 1.865E−03 | 2.657E−03 |
| A6 | 1.357E−04 | −1.072E−03 | 3.439E−04 | 9.491E−04 | −4.542E−04 | −5.406E−04 |
| A8 | −1.076E−04 | 4.506E−05 | −1.504E−04 | −2.324E−04 | 6.880E−05 | 5.124E−05 |
| A10 | 1.601E−05 | −4.900E−06 | 1.470E−05 | 2.899E−05 | −8.491E−06 | −2.519E−06 |

TABLE 2-continued

|     | | | | | | |
| --- | --- | --- | --- | --- | --- | --- |
| A12 | −1.358E−06 | 5.182E−07 | −1.727E−07 | −1.660E−06 | 5.171E−07 | 3.569E−08 |
| A14 | 4.423E−08 | −1.955E−08 | −2.340E−08 | 3.556E−08 | −1.089E−08 | 6.888E−10 |
| A16 | 0.000E+00 | 0.000E+00 | 0.000E+00 | 0.000E+00 | 0.000E+00 | 0.000E+00 |

|     | S7 | S8 | S9 | S10 | S11 | S12 |
| --- | --- | --- | --- | --- | --- | --- |
| K   | −8.43 | −4.98 | 0.45 | −1.18 | −34.16 | −6.01 |
| A4  | 2.928E−03 | 3.413E−03 | 6.496E−03 | 9.789E−03 | −3.940E−03 | −4.159E−03 |
| A6  | −3.974E−04 | −4.322E−04 | −4.520E−04 | −1.086E−03 | −1.969E−03 | 1.922E−04 |
| A8  | 2.933E−05 | 3.780E−05 | 6.284E−05 | 9.971E−05 | 4.502E−05 | −5.960E−06 |
| A10 | 3.843E−07 | −1.478E−06 | −3.827E−06 | −3.151E−06 | −3.336E−06 | 5.352E−08 |
| A12 | −1.773E−07 | 2.009E−08 | 1.105E−07 | −7.487E−08 | 1.276E−07 | 2.019E−09 |
| A14 | 9.509E−09 | −2.446E−10 | −2.039E−09 | 6.129E−09 | −2.425E−09 | −6.587E−11 |
| A16 | −1.787E−10 | 5.248E−12 | 3.506E−11 | −9.279E−11 | 1.802E−11 | 5.862E−13 |

Figure 2B:
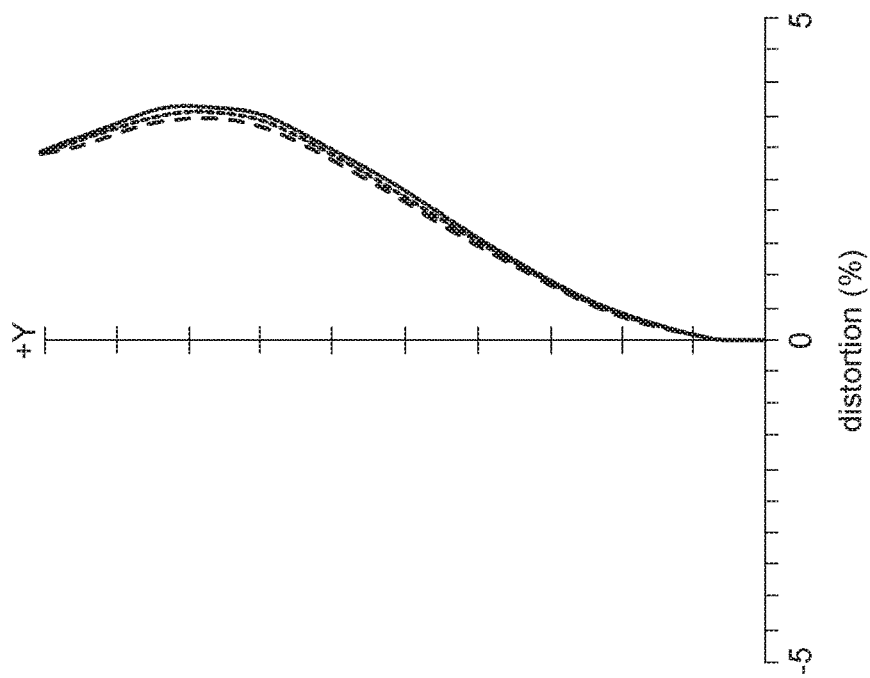
FIG. 2B shows a distortion chart of an optical lens according to an embodiment of the present invention.
Figure 2A:
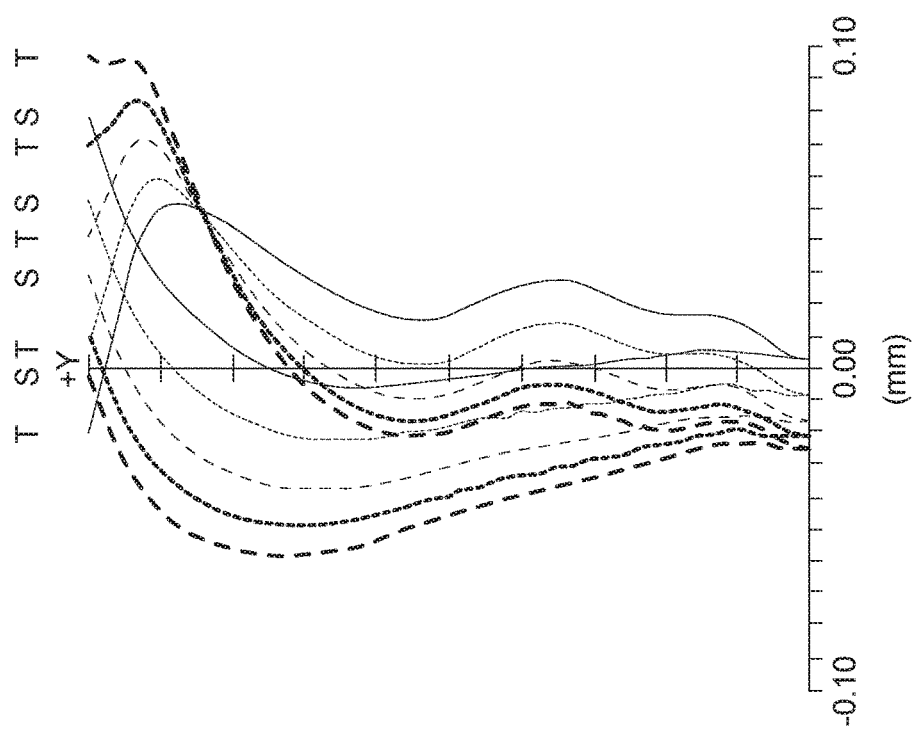
FIG. 2A shows a field curvature chart of an optical lens according to an embodiment of the present invention.

FIG. 2A shows the field curvature chart of the optical lens OL1 according to an embodiment of the present invention. The curves T and S stand for the chromatic aberration of the optical lens OL1 to the tangential rays and the sagittal rays. As shown in the drawing, the tangential values and the sagittal values of light beams are all controlled within favorable ranges.

FIG. 2B shows the distortion chart of the optical lens OL1 according to an embodiment of the present invention. As shown in the drawing, the distortion values of light beams are all set within favorable ranges.

As shown in FIGS. 2A-2B, the field curvature and distortion of the optical lens OL1 of the present embodiment are all well calibrated. Therefore, according to the embodiments of the present invention, the optical lens OL1 can generate high-quality images with high resolution and low chromatic aberration while satisfying the conditions of reduced costs and sizes.

While the invention has been described by way of example and in terms of the preferred embodiment(s), it is to be understood that the invention is not limited thereto. On the contrary, it is intended to cover various modifications, equivalents, and similar arrangements and procedures, and the scope of the invention is intended to be limited solely by the appended claims.

What is claimed is:

1. An optical lens comprising, in order from an object side to an image-forming side:
   a first lens having positive refractive power;
   a second lens having refractive power;
   a third lens having positive refractive power;
   a fourth lens having refractive power;
   a fifth lens having refractive power; and
   a sixth lens having refractive power;
   wherein the fourth lens is a convex-concave lens and/or the first lens is a plastic lens;
   TTL is a distance between an object-side surface of the first lens and an imaging plane, and 10 mm≤TTL≤20 mm; and
   the optical lens satisfies at least one of the following eight conditions:
   the first lens is a concave-convex lens,
   the second lens is a concave-convex lens,
   the third lens is a double convex lens,
   the fifth lens is a concave-convex lens,
   the fourth lens has negative refractive power,
   the fifth lens has positive refractive power,
   V4≤30, and
   |V5−V6|≤10, wherein V4 is an Abbe number of the fourth lens, V5 is an Abbe number of the fifth lens, and V6 is an Abbe number of the sixth lens.

2. The optical lens according to claim 1, wherein F123 is an effective focal length of the first lens, the second lens and the third lens, EFL is an effective focal length of the optical lens, and 0.65≤F123/EFL and/or F123/EFL≤0.90.

3. The optical lens according to claim 1, wherein EFL is an effective focal length of the optical lens, and 0.65≤EFL/TTL and/or EFL/TTL≤0.80.

4. The optical lens according to claim 1, wherein Fno is a F-number of the optical lens, and 1≤Fno and/or Fno≤2.5.

5. The optical lens according to claim 1, wherein the first lens has a refractive index nd1 and an Abbe number vd1, and the optical lens satisfies at least one of the following conditions: nd1≤1.65 and 35≤vd1.

6. The optical lens according to claim 1, wherein the optical lens satisfies at least one of the following conditions: the second lens has negative refractive power and the sixth lens has negative refractive power.

7. The optical lens according to claim 1, wherein at least one of the first lens, the second lens, the third lens, the fourth lens, the fifth lens and the sixth lens is an aspheric lens or a free-form lens; at least one of the second lens, the third lens, the fourth lens, the fifth lens and the sixth lens is a plastic lens.

8. The optical lens according to claim 1, wherein an object-side surface of the fifth lens has at least an inflection point, and/or an image-side surface of the fifth lens has at least an inflection point.

9. An optical lens having an optical axis, and in order from an object side to an image-forming side the optical lens comprising:
   a first lens having positive refractive power;
   a second lens having refractive power;
   a third lens having positive refractive power;
   a fourth lens having negative refractive power;
   a fifth lens having refractive power; and
   a sixth lens having refractive power;
   wherein TTL is a distance between an object-side surface of the first lens and an imaging plane, and 10 mm≤TTL and/or the fourth lens is a convex-concave lens;
   an image-side surface of the sixth lens has an inflection point, a distance between the inflection point and the optical axis is h6, a radius of the sixth lens is H6, and h6/H6<1; and
   the optical lens satisfies at least one of the following conditions:
   the first lens is a concave-convex lens,
   the second lens is a concave-convex lens,
   the third lens is a double convex lens,
   the fifth lens is a concave-convex lens,
   the fifth lens has positive refractive power,
   V4≤30, and ≤|V5-V6|≤10, wherein V4 is an Abbe number of the fourth lens, V5 is an Abbe number of the fifth lens, and V6 is an Abbe number of the sixth lens.

10. The optical lens according to claim 9, wherein F123 is an effective focal length of the first lens, the second lens and the third lens, EFL is an effective focal length of the optical lens, and 0.65≤F123/EFL and/or F123/EFL≤0.90.

11. The optical lens according to claim 9, wherein TTL≤20 mm.

12. The optical lens according to claim 9, wherein EFL is an effective focal length of the optical lens, and 0.65≤EFL/TTL and/or EFL/TTL≤0.80.

13. The optical lens according to claim 9, wherein Fno is a F-number of the optical lens, and 1≤Fno and/or Fno≤2.5.

14. The optical lens according to claim 9, wherein the first lens has a refractive index nd1 and an Abbe number vd1, and the optical lens satisfies at least one of the following conditions: nd1≤1.65 and 35≤vd1.

15. The optical lens according to claim 9, wherein the optical lens satisfies at least one of the following conditions: the second lens has negative refractive power and the sixth lens has negative refractive power.

16. The optical lens according to claim 9, wherein at least one of the first lens, the second lens, the third lens, the fourth lens, the fifth lens and the sixth lens is an aspheric lens; at least one of the first lens, the second lens, the third lens, the fourth lens, the fifth lens, and the sixth lens is a plastic lens.

17. The optical lens according to claim 9, wherein an object-side surface of the fifth lens has at least an inflection point, and/or an image-side surface of the fifth lens has at least an inflection point.

18. An optical lens having an optical axis, and in order from an object side to an image-forming side the optical lens comprising:
a first lens having positive refractive power;
a second lens having refractive power;
a third lens having positive refractive power;
a fourth lens having refractive power;
a fifth lens having refractive power; and
a sixth lens having refractive power;
wherein TTL is a distance between an object-side surface of the first lens and an imaging plane, and 10 mm≤TTL and/or the fourth lens is a convex-concave lens;
an image-side surface of the sixth lens has an inflection point, a distance between the inflection point and the optical axis is h6, a radius of the sixth lens is H6, and h6/H6<1; and
the optical lens satisfies at least one of the following conditions:
the first lens is a concave-convex lens,
the second lens is a concave-convex lens,
the fifth lens is a concave-convex lens,
the fourth lens has negative refractive power,
V4≤30, and
|V5-V6|≤10, wherein V4 is an Abbe number of the fourth lens, V5 is an Abbe number of the fifth lens, and V6 is an Abbe number of the sixth lens.

19. The optical lens according to claim 18, wherein the first lens is a plastic lens.

* * * * *